(12) United States Patent
Pulikanti et al.

(10) Patent No.: US 12,646,965 B2
(45) Date of Patent: Jun. 2, 2026

(54) UNINTERRUPTIBLE POWER SUPPLY

(71) Applicant: ABB SCHWEIZ AG, Baden (CH)

(72) Inventors: Sridhar Pulikanti, Napier (NZ); Simon Walton, Napier (NZ); Mathias Brand, Hastings (NZ); Dustin Murdock, Napier (NZ); Robert Turner, Hastings (NZ); Nicholas James Elliot, Hastings (NZ)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 19/012,624

(22) Filed: Jan. 7, 2025

(65) Prior Publication Data

US 2025/0141259 A1      May 1, 2025

Related U.S. Application Data

(63) Continuation of application No. 18/002,620, filed as application No. PCT/EP2020/069784 on Jul. 13, 2020, now abandoned.

(51) Int. Cl.
*H02J 9/06* (2006.01)
*H02J 1/02* (2026.01)
(Continued)

(52) U.S. Cl.
CPC ................ *H02J 9/062* (2013.01); *H02J 1/02* (2013.01); *H02J 1/102* (2013.01)

(58) Field of Classification Search
CPC .... H02J 9/062; H02J 1/02; H02J 1/102; H02J 3/32
See application file for complete search history.

(56) References Cited

U.S. PATENT DOCUMENTS

2016/0099607 A1     4/2016   Landis
2017/0012452 A1     1/2017   Kang et al.
(Continued)

FOREIGN PATENT DOCUMENTS

CN       103001313 A      3/2013
EP         2717405 A1      4/2014
(Continued)

OTHER PUBLICATIONS

International Search Report and Written Opinion; issued by the ISA/EP European Patent Office, regarding corresponding patent application Serial No. PCT/EP2020/069784; dated Mar. 17, 2021; 14 pages.

*Primary Examiner* — Jeffrey M Shin
(74) *Attorney, Agent, or Firm* — Greenberg Traurig, LLP

(57)      ABSTRACT

Embodiments of the present disclosure relate to an uninterruptible power supply. The uninterruptible power supply comprises a switch, a power management module, an inverter and a controller. The switch is arranged between a load and a power source, the power source configured to supply power to the load. The power management module comprises a main energy storage and configured to reduce a ripple experienced by the main energy storage. The inverter is arranged between and coupled to the power management module and the load. The controller is coupled to the power management module, the inverter and the switch, the controller configured to control the inverter to regulate output voltage magnitude and frequency by regulating the power exchange between the inverter and the power source. According to embodiments of the present disclosure, the overcharging of the energy storage during sudden load rejections or utility phase jumps can be avoided.

20 Claims, 3 Drawing Sheets

(51) Int. Cl.
    *H02J 1/10*          (2026.01)
    *H02J 1/102*       (2026.01)

(56)              References Cited

U.S. PATENT DOCUMENTS

| | | | |
|---|---|---|---|
| 2017/0117748 | A1 | 4/2017 | Mondal |
| 2020/0006980 | A1* | 1/2020 | Tolakanahalli ..... H02M 1/4225 |

FOREIGN PATENT DOCUMENTS

| | | | |
|---|---|---|---|
| EP | 3588758 | A1 | 1/2020 |
| WO | 2017-001498 | A1 | 1/2017 |

* cited by examiner

UNINTERRUPTIBLE POWER SUPPLY

CROSS-REFERENCE TO RELATED APPLICATIONS

This application is a continuation of U.S. application Ser. No. 18/002,620, filed on Dec. 20, 2022, which is a national stage application claiming priority to international patent application Serial No.: PCT/EP2020/069784, filed on Jul. 13, 2020, the entire contents of which are hereby incorporated by reference in their entireties.

FIELD

Example embodiments of the present disclosure generally relate to the field of uninterrupted power supply and, more particularly, to power management in a medium voltage uninterrupted power supply.

BACKGROUND

In the uninterruptible power supply (UPS) which is based on the static converter, an energy storage device is a key component. A medium voltage uninterrupted power supply based on impedance isolated static converter (also referred to as "ZISC-based MV-UPS") mainly operates in two modes, i.e., a power conditioning mode and an island mode. The two modes can be switched by a switch comprised in the UPS. When the switch is closed, the UPS is in the power conditioning mode, and controls the output voltage magnitude and frequency by regulating the power change between the UPS and the power source. When the power quality events occur, the switch is opened and the UPS transits to the island mode. In the island mode, the load active power flows through an inverter from the energy storage and the UPS controls the output voltage with given voltage magnitude and frequency.

When ZISC-based MV-UPS is in power conditioning mode, if the load rejection or utility phase jump perturbation occurs, the current flow cannot change instantaneously, and the energy must be absorbed by the energy storage connected to inverter direct current bus. This event may overcharge the energy storage and result in bus overvoltage, which ends up in tripping the UPS. As the uninterruptible power supply may be exposed to the negative sequence and harmonics, a ripple current on the direct current bus would be incurred. Moreover, the UPS manufacturers recommend that the voltage ripple is 0.5% of a recommended float voltage, however, considering the operational specification of ZISC-based MV-UPS, the energy storage would experience voltage ripple up to 15% of recommended float voltage. This ripple proves to be deleterious to the energy storage due to micro cycling. The energy storage when exposed to high ripple current would suffer from a degradation of the storage life time.

Therefore, there is a need for an effective design to minimize the ripple exposed by energy storage device to improve the life time of the uninterruptible power supply and avoid over charging of energy storage during sudden load rejections or utility phase jumps, so as to enhance the robustness and reliability of the UPS.

SUMMARY

As described above, the negative sequence voltages and harmonics may be imposed by load or utility, which may adversely affect the normal operation of the uninterruptible power supply. Some approaches are proposed but they are not satisfactory.

For example, in EP 2717405A1, a solution is proposed for reducing harmonic voltage components on a battery for uninterruptible power supplies. However, this solution cannot reduce the ripple and absorb the excess transient energy of the static converter and thus its use of range would be limited.

Example embodiments of the present disclosure propose a solution to at least address the problems in the prior art and/or the potential problems.

Embodiments of the present disclosure relate to an uninterruptible power supply. The uninterruptible power supply comprising: a switch arranged between a load and a power source, the power source configured to supply power to the load, a power management module comprising a main energy storage and configured to reduce a ripple experienced by the main energy storage; an inverter arranged between and coupled to the power management module and the load; and a controller coupled to the power management module, the inverter and the switch, the controller configured to control the inverter to regulate output voltage magnitude and frequency by regulating the power exchange between the inverter and the power source.

According to embodiments of the present disclosure, the overcharging of energy storage during sudden load rejections or utility phase jumps can be avoided.

In some embodiments, the power management module comprises a ripple blocking unit coupled in series to the main energy storage and configured to reduce a ripple current associated with the main energy storage.

In some embodiments, the power management module further comprises: a power management unit configured to regulate a power to the inverter and coupled to the ripple blocking unit, wherein the ripple blocking unit is coupled between the power management unit and the main energy storage.

In some embodiments, the power management module further comprises: a ripple isolation unit coupled in series to the main energy storage and configured to isolate the main energy storage from direct current bus associated with the inverter, the inverter connected to a power bus which connects the load and the power source; and a secondary energy storage coupled in parallel with the main energy storage and the ripple isolation unit.

In some embodiments, the power management unit is disposed at an upstream or downstream side of the ripple blocking unit.

In some embodiments, the uninterruptible power supply further comprises a series reactor coupled between the switch and the load and configured to isolate the load from power source disturbances.

In some embodiments, the ripple blocking unit comprises an active voltage conditioner.

In some embodiments, the power management unit comprises a DC chopper or a rectifier.

In some embodiments, the ripple isolation unit comprises a diode, a silicon controlled rectifier or a switch.

BRIEF DESCRIPTION OF THE DRAWINGS

Through the following detailed description of the example embodiments of the present disclosure with reference to the accompanying drawings, the above and other objectives, features and advantages of the present disclosure will become more apparent. In the drawings, a plurality of embodiments of the present disclosure is explained in a non-restrictive manner by way of examples, wherein.

DETAILED DESCRIPTION OF EMBODIMENTS

Figure 1:
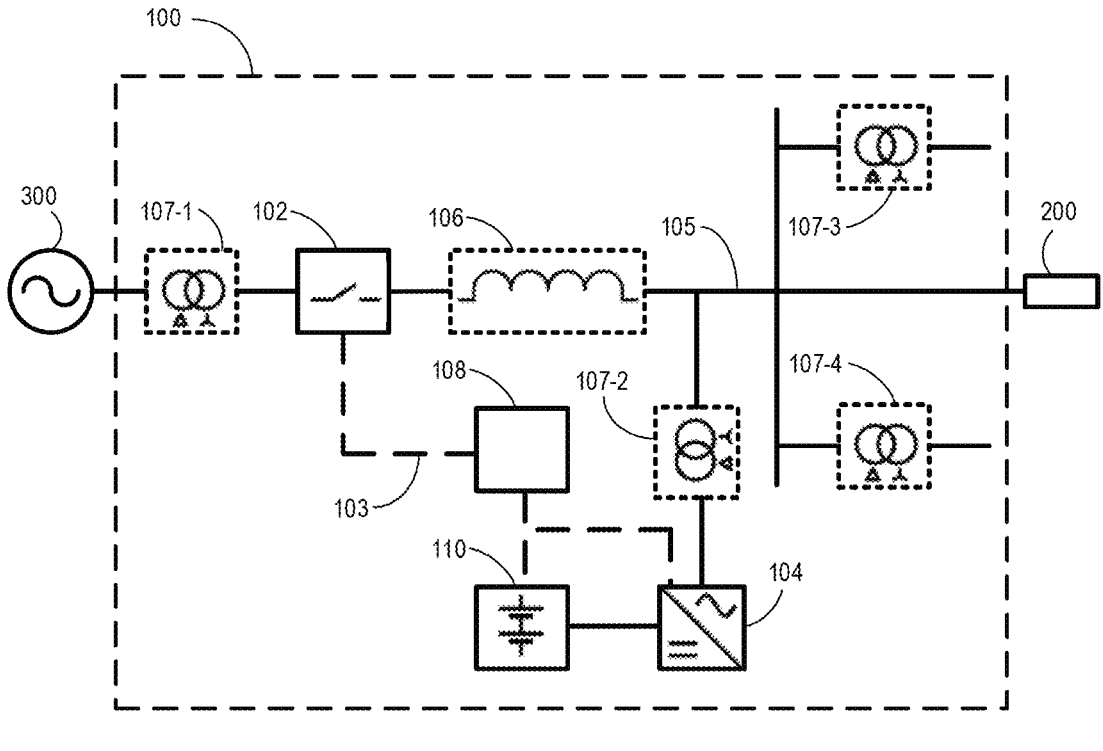
FIG. 1 illustrates a diagram of an uninterruptible power supply in accordance with example embodiments of the present disclosure.

Principles of the present disclosure will now be described with reference to various example embodiments illustrated in the drawings. It should be appreciated that description of those embodiments is merely to allow those skilled in the art to better understand and further implement example embodiments disclosed herein and is not intended to limit the scope disclosed herein in any manner. It should be noted that similar or same reference signs can be used in the drawings when feasible, and similar or same reference signs can represent the similar or same functions. Those skilled in the art can readily recognize that alternative embodiments of the structure and method described herein can be employed from the following description without departing from the principles of the present disclosure described herein.

As used herein, the term "comprises" and its variants are to be read as open-ended terms that mean "comprises, but not limited to." The term "based on" is to be read as "based at least in part on." The terms "one embodiment" and "embodiment" are to be read as "at least one embodiment." The term "a further embodiment" is to be read as "at least a further embodiment." The terms "first", "second" and so on can refer to same or different objects. The following text also can include other explicit and implicit definitions. Definitions of the terms are consistent throughout the description unless the context indicates otherwise.

FIG. 1 shows an uninterruptible power supply 100 in accordance with an example embodiment of the present disclosure. The uninterruptible power supply 100 according to an embodiment is a medium voltage uninterruptible power supply, which is a type of impedance isolated static converter. It is to be understood that this type of uninterruptible power supply 100 is merely an example without suggesting any limitation as to the scope of the present disclosure.

As shown in FIG. 1, the uninterruptible power supply 100 is connected at a downstream side (also referred to as "load side") to a load 200 and at an upstream side (also referred to as "power supply side") to a power source 300. In this embodiment, the power source 300 is a grid supply, which provides a utility voltage. It is to be understood that the power source 300 may be other types of power sources. The load 200 and the power source 300 are interconnected by a power bus 105, which comprise cables or bus bars. The power bus 105 in this embodiment is considered as part of the uninterruptible power supply 100, although the power bus 105 can also be part of a system installation for interconnecting the power source 300 and the load 200. It is also to be understood that the load 200 may comprise individual load units, which are individually connected to the power bus 105. The load units together form the load 200.

The uninterruptible power supply 100 comprises a switch 102 which is arranged in the power bus 105 between the power source 300 and the load 200.

As illustrated in FIG. 1, the uninterruptible power supply 100 further comprises a power management module 110.

The power management module 110 comprises a main energy storage 112 and is configured to reduce a ripple experienced by the main energy storage 112. The exemplary forms of the power management module 110 will be discussed with reference to FIGS. 2-5 hereinafter in more detail.

The uninterruptible power supply 100 further comprises an inverter 104 connected to the power bus 105. The inverter 104 is arranged between the power management module 110 and the load 200 and also coupled to the power management module 110 and the load 200. In the shown embodiments, the uninterruptible power supply 100 also comprises a controller 108. The controller 108 is configured to control the performance of the uninterruptible power supply 100. The controller 108 is separated from other components of the uninterruptible power supply 100. In an alternative embodiment, the controller 108 may be provided integral with the inverter 104.

As shown in FIG. 1, the controller 108 is connected to the switch 102, the inverter 104 via a communication connection 103. In this shown embodiment, the power management module 110 is also connected to the controller 108 via the communication connection 103. The communication connection 103 may be an industrially robust, low latency and/or long distance communication link, for example. The communication connection 103 is provided as a communication bus, to which all the components of the uninterruptible power supply 100 are connected to. In an alternative embodiment, all the components of the uninterruptible power supply 100 are individually connected to the controller 108. In some embodiments, the communication connection 103 comprises a physical connection based on fiber optic. Alternatively, in other embodiments, the physical connection is based on a twisted pair connection. The communication connection 103 enables a high speed, long distance communication connection with low latency.

In general, the uninterruptible power supply 100 is configured to supply power to the load 200 in case of a power quality event, e.g., when the power source 300 fails. As used herein, a power quality event may refer to any event that may endanger the operation of the load 200, in particular voltage drops, complete failures of the power source 300, or voltage disturbances in the power source 300.

The controller 108 is configured to monitor the power source for power quality events. It is to be understood that the uninterruptible power supply 100 described herein is only for illustration without suggesting any limitations as to the scope of the subject matter.

When the uninterruptible power supply 100 is in the power conditioning mode, the output voltage magnitude and frequency is controlled by regulating the power change between the uninterruptible power supply 100 and the power source 300. If the power quality event is detected, the controller 108 is configured to perform a transfer of power supply from the power source to the energy storage via the inverter 104. During the transfer, the controller 108 is configured to separate the power supply from the load 200 using the switch 102 and the uninterruptible power supply 100 is then switched to an island mode. The inverter 104 is used assist the power supply to the load 200 in the island mode.

In a steady state condition of the uninterruptible power supply 100, by comparing the reference active power to the measured active power supported by the uninterruptible power supply 100, the controller 108 regulates the power delivered by the uninterruptible power supply 100. In this way, if bulk charging of energy storage is not required, the uninterruptible power supply 100 exchanges zero active power from energy storage by setting zero power reference. When small and large load rejections or utility phase jump perturbations happen, the response of the power loop influences the power absorption unit components having time constant for diverting active power to avoid overvoltage. The time constant refers to indication of diverting active power to avoid direct current bus overvoltage.

According to embodiments of the present disclosure, by providing the power management module 110, the impact of the overcharging of the energy storage caused by the sudden change in the load 200 or the change of the phase angle of the power source 300 can be minimized. The excessive power can be dissipated by the power management module 110 or exchanged with the power from the power supply 100. Therefore, with the coordination of the active power control response to transfer the power to utility and power management unit time constant for diverting active power, the direct current bus overvoltage can be avoided. In this way, the adverse effect incurred by the sudden load rejections or the utility phase jumps can also be avoided.

Figure 2:
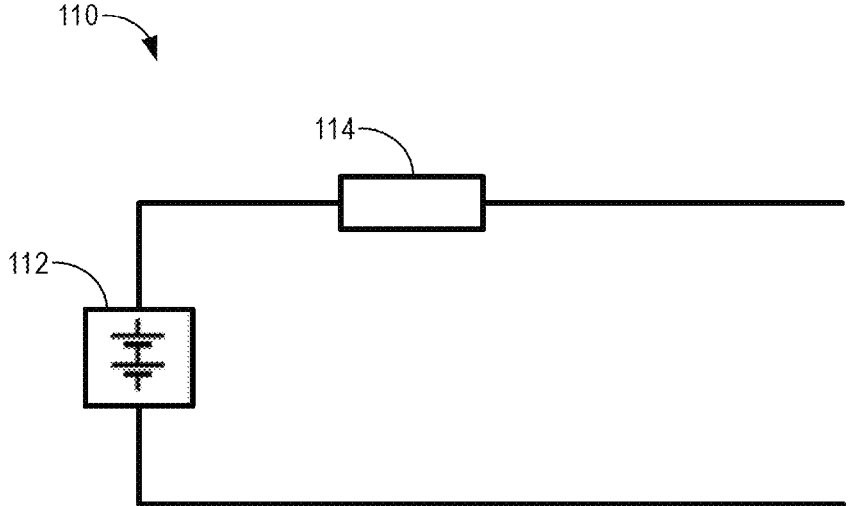
FIGS. 2-5 illustrate various implementations of the power management module shown in FIG. 1 in accordance with example embodiments of the present disclosure.

In some embodiments, as shown in FIG. 2, the power management module 110 may comprise a ripple blocking unit 114 coupled in series to the main energy storage 112. The ripple blocking unit 114 is configured to reduce a ripple current associated with the main energy storage 112. In some embodiments, the ripple blocking unit 114 may comprise an active voltage conditioner, for example. It is to be understood that the active voltage conditioner described herein is merely an example and the specific forms of the ripple blocking unit 114 are not limited to embodiments of the present disclosure.

In the conventional approaches, due to negative sequence and harmonics that might be imposed by the load 200 or the power source 300, the main energy storage 112 may be exposed to high ripple current, which may degrade the service life of the main energy storage 112. In the shown embodiments, by providing the ripple blocking unit 114 in the present disclosure, the impact of voltage ripple across the energy storage can be reduced and therefore the service life of the uninterruptible power supply 100 would not be sacrificed.

In the shown embodiments, if the energy storage is relatively less sensitive to the voltage ripple and capable of handling the power inflow without the inverter direct current bus overvoltage, the power management module 110 comprising the main energy storage 112 and the ripple blocking unit 114 are adequate to minimize the ripple of power and thus no additional units are required.

Figure 3:
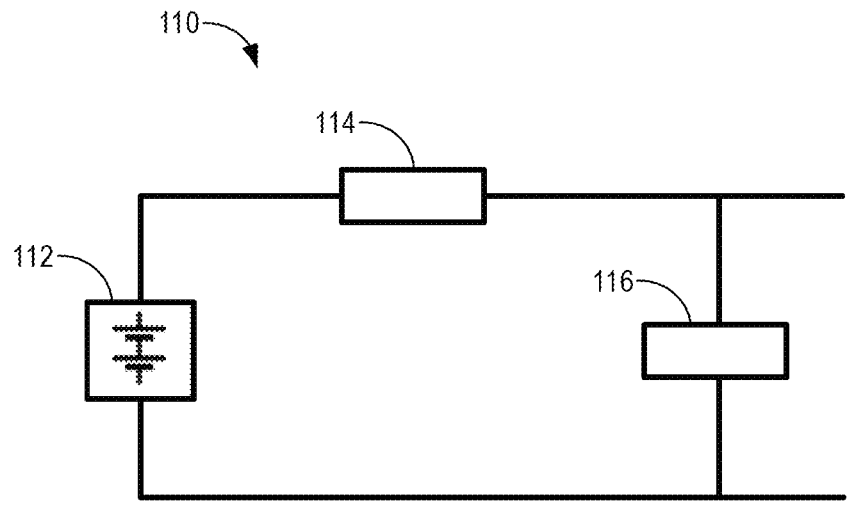

With reference to FIG. 3, in some embodiments, the power management module 110 may further comprise a power management unit 116 configured to regulate a power to the inverter 104 and coupled to the ripple blocking unit 114. As illustrated, the ripple blocking unit 114 is coupled between the power management unit 116 and the main energy storage 112. As used herein, the power management unit 116 may be referred to as power absorption unit. When a sudden load rejection or the utility phase jump happens, inverter direct current bus voltage overvoltage due to overcharging of energy storage may cause the uninterruptible power supply 100 to trip. In some embodiment, the power management unit 116 may be configured to absorb the power if the excess transient energy of the static converter cannot be dissipated. In this way, the power management unit 116 is used to divert or dissipate the absorbed power and remain in the power conditioning mode and the damage to the load 200 can be avoided.

In some embodiments, the power management unit 116 may comprise a DC chopper or a rectifier. The DC chopper may be configured to regulate the voltage of the bus 105 by dissipating excessive power through chopper resistor, for example. The rectifier may be configured to exchange excessive power to the power source 300 so as to control the voltage of the bus 105. It is to be understood that the devices described herein are merely examples and the specific forms of the power management unit 116 are not limited to embodiments of the present disclosure. The power management unit 116 may be configured to restrict the excessive power inflow into the energy storage. In this way, the ripple current exposed by the main energy storage 112 can be minimized in a cost effective manner and the direct current bus overvoltage can be avoided effectively.

Figure 4:
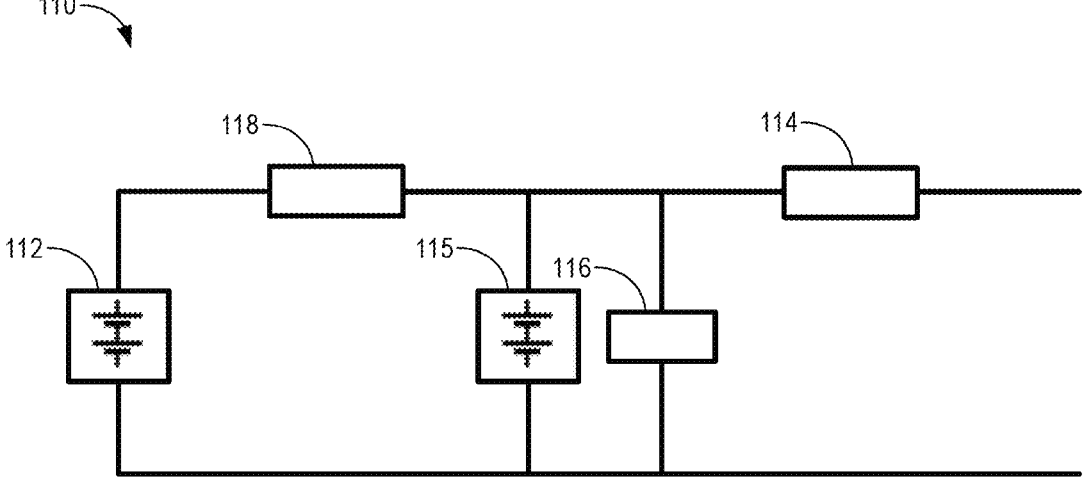
Figure 5:
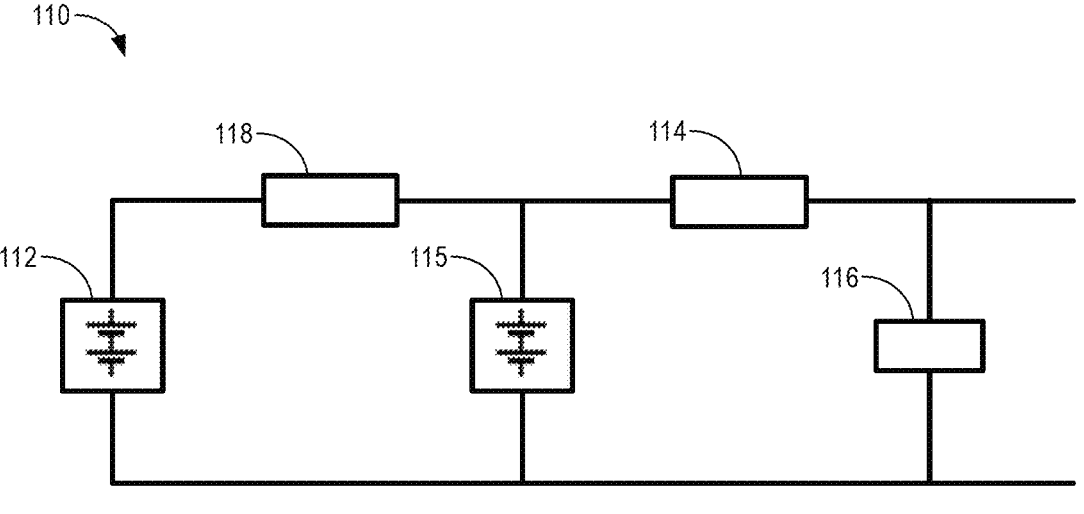

In the conventional approaches, if the energy storage is sensitive to the voltage ripple and the energy storage is not capable of absorbing excessive inflow power, a direct current bus overvoltage may damage the uninterruptible power supply. In order to at least overcome the above problems, in some embodiments, the power management module 110 may further comprise a ripple isolation unit 118 coupled in series to the main energy storage 112, as illustrated in FIGS. 4 and 5. The ripple isolation unit 118 may be configured to isolate the main energy storage 112 from the direct current bus associated with the inverter 104. As illustrated, the inverter 104 is connected to a power bus 105, which is connecting the load 200 and the power source 300 during the steady state operation. By incorporating the ripple isolation unit 118, the power management module 110 is configured to minimize the impact of ripple on energy storage life and avoid the overcharging of energy storage unit during sudden utility or load events. In addition, the power management module 110 may further comprise a secondary energy storage 115 coupled in parallel with the main energy storage 112 and the ripple isolation unit 118.

In some embodiments, the ripple isolation unit 118 may be selected from a group consisting of a diode, a silicon controlled rectifier or a switch. The diode may be used to conduct current primarily in one direction. The silicon controlled rectifier (also referred to as "SCR") may be a four-layer solid-state current-controlling device. It is to be understood that the devices described herein are examples only and the specific forms of the ripple isolation unit 118 are not limited to embodiments of the present disclosure.

In some embodiments, as shown in FIG. 4, the power management unit 116 may be coupled in parallel with the secondary energy storage 115. The power management unit 116 in this embodiment is provided at the upstream side of the ripple blocking unit 114. In alternative embodiments, as shown in FIG. 5, the power management unit 116 may be also provided at the downstream side of ripple blocking unit 114. In this way, the layout of the power management unit 116 can be adjusted according to the different need of the users and the range of use of the uninterruptible power supply 100 would be increased.

It is to be understood that though FIGS. 2-5 illustrate various implementations of the power management module 110, they are just a few examples, and the power management module 110 may be of other forms apart from the implementations described herein.

In some embodiments, the uninterruptible power supply 100 may further comprise a series reactor 106 coupled between the switch 102 and the load 200 and configured to isolate the load from power source disturbances. In this way, the negative effects brought about by the disturbances such as harmonics and voltage unbalance are decoupled and the inverter is allowed continuously condition and filter utility disturbance.

Referring back to FIG. 1, in some embodiments, the uninterruptible power supply 100 may further comprise a plurality of coupling transformers 107-1, 107-2, 107-3 and 107-4 configured to perform voltage adaptations as required. In some embodiments, as illustrated, a coupling transformer 107-1 may be provided at an upstream side of the switch 102. In other embodiments, a further coupling transformer 107-2 may be provided between the inverter 104 and the power bus 105 connecting the load 200 and the power source 300. Alternatively, in other embodiments, further coupling transformers 107-3, 107-4 may be provided at the downstream side of the power bus 105 to perform voltage adaptation for the connected load 200. The coupling transformers 107-3, 107-4 connecting the load 200 are also referred to as network feeders or feeders. The coupling transformers allow the uninterruptible power supply 100 to clear the faults, and the layout of coupling transformers can provide enough accuracy in tracking the voltages in the uninterruptible power supply 100.

In some embodiments, the main energy storage 112 and the secondary energy storage 115 may be of a same type. In other embodiments, they may be of the different types. For example, the main energy storage 112 and the secondary energy storage 115 may be combination of lead acid battery and super capacitor. Alternatively, in further embodiments, the main energy storage 112 and the secondary energy storage 115 may be combination of lead acid and lithium ion batteries. It is to be understood that these specific forms are merely examples without suggesting any limitation as to the scope of the present disclosure.

The types of the secondary energy storage 115 may be selected in consideration of the ability of the uninterruptible power supply during the steady state. In this way, the main energy storage 112 would not be exposed to high ripple current due to negative sequence voltages and harmonics of the load 200 and/or the power source 300.

Compared with the conventional approaches, the ripple blocking unit 114, the power management unit 116 and the ripple isolation unit 118 comprised in the uninterruptible power supply 100 complement each other and the functional coordination can be achieved. Therefore, a better performance is provided to manage the uninterruptible power supply 100.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An uninterruptible power supply comprising:
a switch arranged between a load and a power source, the power source configured to supply power to the load;
a power management module comprising:
a main energy storage, and
a power management unit,
wherein the power management unit is configured to reduce a ripple experienced by the main energy storage;
an inverter arranged between and coupled to the power management module and the load; and
a controller coupled to the power management module, the inverter and the switch, the controller configured to control the inverter to regulate output voltage magnitude and frequency by regulating a power exchange between the inverter and the power source;
wherein the power management unit is configured to regulate power to the inverter.

2. The uninterruptible power supply of claim 1, wherein the power management module comprises:
a ripple blocking unit coupled in series to the main energy storage and configured to reduce a ripple current associated with the main energy storage.

3. The uninterruptible power supply of claim 2,
wherein the power management unit is coupled to the ripple blocking unit, and
wherein the ripple blocking unit is coupled between the power management unit and the main energy storage.

4. The uninterruptible power supply of claim 2, wherein the power management module further comprises:
a ripple isolation unit coupled in series to the main energy storage and configured to isolate the main energy storage from direct current bus associated with the inverter, the inverter connected to a power bus which connects the load and the power source; and
a secondary energy storage coupled in parallel with the main energy storage and the ripple isolation unit.

5. The uninterruptible power supply of claim 4, wherein the power management unit is disposed at an upstream or downstream side of the ripple blocking unit.

6. The uninterruptible power supply of claim 1, further comprising:
a series reactor coupled between the switch and the load and configured to isolate the load from power source disturbances.

7. The uninterruptible power supply of claim 2, wherein the ripple blocking unit comprises an active voltage conditioner.

8. The uninterruptible power supply of claim 3, wherein the power management unit comprises a DC chopper or a rectifier.

9. The uninterruptible power supply of claim 4, wherein the ripple isolation unit comprises a diode, a silicon controlled rectifier or a switch.

10. The uninterruptible power supply of claim 1, wherein, in a steady state condition, the controller regulates the power delivered to the inverter by comparing a reference active power to a measured active power.

11. The uninterruptible power supply of claim 1, wherein, in a power conditioning mode, the controller controls the inverter to regulate the output voltage magnitude and the frequency by regulating the power exchange between the inverter and the power source.

12. The uninterruptible power supply of claim 1, wherein, in response to detecting a power quality event, the controller is configured to perform a transfer of power supply from the power source to the main energy storage via the inverter.

13. The uninterruptible power supply of claim 12, wherein the controller is further configured to separate the power source from the load by operating the switch and placing the uninterruptible power supply to an island mode.

14. The uninterruptible power supply of claim 1, wherein the main energy storage is in parallel connection with the power management unit.

15. The uninterruptible power supply of claim 14, wherein the power management module comprises:
a ripple blocking unit coupled in series to the main energy storage and configured to reduce a ripple current associated with the main energy storage.

16. The uninterruptible power supply of claim 15, wherein the power management unit is disposed at an upstream side of the ripple blocking unit.

17. The uninterruptible power supply of claim 15, wherein the power management unit is disposed at a down-stream side of the ripple blocking unit.

18. The uninterruptible power supply of claim 1, further comprising:

at least one transformer comprising:

a first transformer, wherein the first transformer is located at an upstream side of the switch, the first transformer performing voltage adaptations between the power source and the switch.

19. The uninterruptible power supply of claim 18, wherein the at least one transformer further comprises:

a second transformer, wherein the second transformer is located between the inverter and a power bus connecting the power source to the load, the second transformer performing voltage adaptations between the inverter and the power source.

20. The uninterruptible power supply of claim 19, wherein the at least one transformer further comprises:

a third transformer, and a fourth transformer, wherein the third transformer and the fourth transformer are located downstream of the inverter on the power bus, the third transformer and the fourth transformer performing voltage adaptations for the load.

* * * * *